United States Patent [19]

Burchick

[11] Patent Number: 4,797,791
[45] Date of Patent: Jan. 10, 1989

[54] FOOT PEG WITH LIGHT

[76] Inventor: Ronald W. Burchick, 348 W. 18th St., Erie, Pa. 16502

[21] Appl. No.: 162,145

[22] Filed: Feb. 29, 1988

[51] Int. Cl.$^4$ ................................................ B62J 6/00
[52] U.S. Cl. ........................................ 362/72; 362/61; 280/289 R; 280/291
[58] Field of Search ............... 363/61, 72; 280/289 R, 280/291; 180/219; 296/75

[56] References Cited

U.S. PATENT DOCUMENTS

| | | | |
|---|---|---|---|
| 2,185,600 | 1/1940 | McComb | 362/72 |
| 2,732,541 | 1/1956 | MacMahon | 362/72 |
| 4,030,561 | 6/1977 | Hashimoto et al. | 280/291 |
| 4,174,852 | 11/1979 | Panzica et al. | 280/289 R |
| 4,546,993 | 10/1985 | Walker | 280/291 |
| 4,591,179 | 5/1986 | Nakamura | 280/291 |
| 4,623,954 | 11/1986 | Schott et al. | 362/72 |
| 4,638,682 | 1/1987 | Michiyama | 560/741 |

Primary Examiner—Ira S. Lazarus
Assistant Examiner—Sue Hagarman
Attorney, Agent, or Firm—Charles L. Lovercheck; Wayne L. Lovercheck; Dale R. Lovercheck

[57] ABSTRACT

A combination light and motorcycle foot peg is disclosed. The light has a lens that is visible from front, rear and side of the foot peg. The light projection warns motor vehicles of the width of the motorcycle that they are following or approaching. The foot peg, according to the invention, can be folded up or can be moved down to a normal position for use. The foot peg, according to the invention, is slightly longer than other conventional foot pegs to bring the light out of the outside edge of the motorcycle profile.

6 Claims, 2 Drawing Sheets

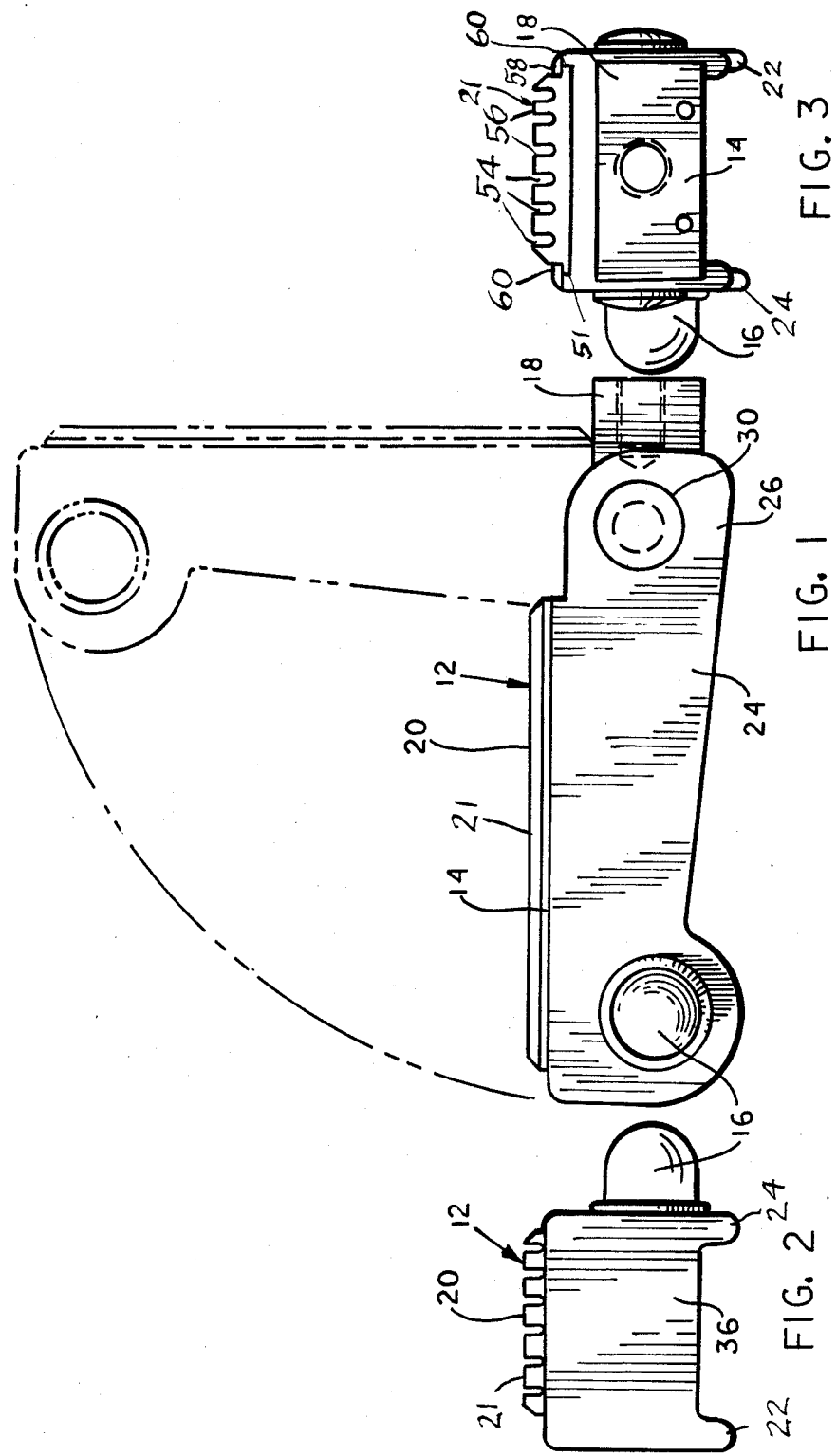

FOOT PEG WITH LIGHT

BACKGROUND OF THE INVENTION

This invention relates to motorcycle accessories and more particularly to a lighted foot peg for motorcycles. The headlight and tail lights of a motorcycle do not inform other motorists of the position of the vehicle in question in order to avoid collision therewith. Applicant has conceived a lighted motorcycle foot peg that is slightly longer than the conventional peg, long enough to conform to the actual profile of the motorcycle that will enable other motorists to avoid collision and damage to the motorcycle having this lighted foot peg on it, and at the same time, will enhance the appearance of the motorcycle having the light. By making the peg longer than the conventional peg, the light will be more visible and will present a wider profile to oncoming motorists.

Applicant is aware of the following U.S. Patents:

U.S. Pat. No. 4,546,993 to Walker shows a motorcycle passenger floorboard but has no light on it.

U.S. Pat. No. 4,591,179 to Nakamura shows a bar step for a small-sized vehicle but no light.

U.S. Pat. No. 4,638,682 to Michiyama shows an auxiliary pedal device for trick-cycling attached to the front fork blade of a bicycle.

U.S. Pat. No. 4,623,954 to Schott et al shows a handlebar safety light for bicycles which could not be used as a foot peg light.

STATEMENT OF THE INVENTION

The light disclosed herein, in combination with a motorcycle foot peg, provides a safety device which can be swung up out of the way when not in use and can be swung out to use position where the light will be near the extreme edge of the projected view of the motorcycle. The light is located where it will be especially visible to oncoming motorists and the foot peg is as wide as the front profile of the motorcycle.

OBJECTS OF THE INVENTION

It is an object of the invention to provide an improved foot peg.

Another object of the invention is to provide a safer foot peg.

Another object of the invention is to provide a lighted foot peg that extends out as wide as the profile of the motorcycle.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 1 is a rear view of the combination according to the invention with the foot peg folded out as for traveling.

FIG. 2 is a side view of the combination according to the invention.

FIG. 3 is a side view of the foot peg removed from a motorcycle.

DETAILED DESCRIPTION OF THE DRAWING

Figure 4:
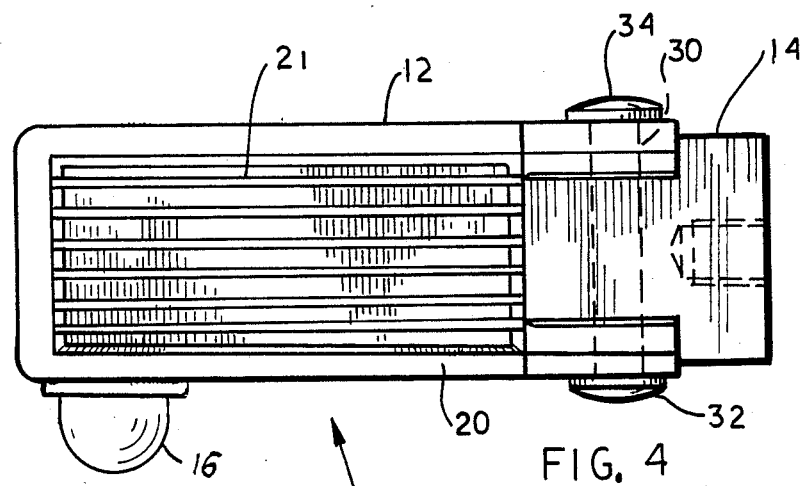
FIG. 4 is a top view of the combination according to the invention.
Figure 5:
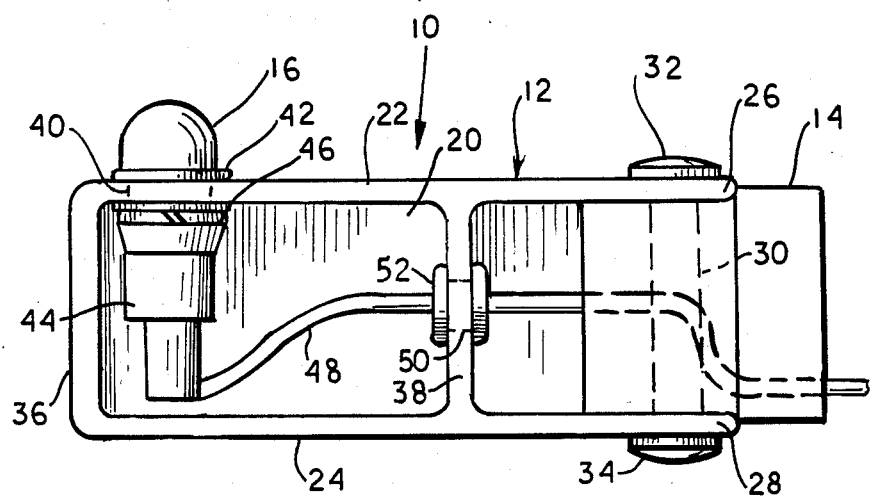
FIG. 5 is a bottom view of the combination.

Now with more particular reference to the drawing, I show a combination 10 of a foot peg 12, a bracket 14 and lamp 16, suitable to be supported or attached by bracket 14 to a motorcycle frame, which may be any well-known type of clamp or attaching means.

Foot peg 12 is made up of a top 20 having a top anti-skid removable foot pad 21 made of plastic, rubber or other suitable material. Two spaced channel-like side flanges 22 and 24 are attached to top 20 and extend downwardly from top 20. Side flanges 22 and 24 extend toward bracket 14, forming ears 26 and 28 which receive bracket 14 between them. Hinge pin 30 extends through holes in ears 26 and 28 and through an aligned hole in bracket 14. Hinge pin 30 has two enlarged ends 32 and 34 attached to it, which overlie the ends of ears 26 and 28 and retain hinge pin 30 in position.

Removable foot pad 21 has spaced parallel grooves 54 which define spaced parallel ribs 56 that extend across the top of foot peg 12 from one end to the other. Removable foot pad 21 has outwardly extending flanges 58 which are received under flanges 58 which overlie flanges 60 and hold removable foot pad 21 in position. Removable foot pad 21 can be removed and replaced by sliding removable foot pad 21 from under flanges 60 and sliding a new pad under flanges 58.

End flange 36 is attached to side flanges 22 and 24 and foot pad 21. Web 38 is formed between side flanges 22 and 24, between hinge pin 30 and end flange 36. Web 38 is fixed to top 20 and to side flanges 22 and 24. Side flange 22 has opening 40. A lamp socket 42 is received in opening 40. Socket 42 has lamp base 44, which overlies side flange 22 around opening 40. Fastening means 46, such as a snap ring or a suitable nut, is supported on lamp base 44 overlying the outside of side flange 22 around opening 40. The lamp 16 is received in lamp base 44 and an electric line 48 is attached to lamp base 44. Electric line 48 extends through central opening 50 in web 38. Rubber grommet 52 is received in central opening 50. Electric line 48 extends through rubber grommet 52 between hinge pin 30 and top 20 and is adapted to be attached to an electrical system, such as a battery or a generating system.

Thus, when the motorcycle operator turns on the lamp 16, the end of the foot peg 12 will be visible to persons approaching the motorcycle, and they will be aware of the clearance necessary between the side of the motorcycle and their vehicle, thus avoiding collisions.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination [10], a motorcycle foot peg [12], a bracket [14] and a lamp [16],
    said bracket [13] having means [18] for attaching said bracket [14] to a motorcycle frame,
    said foot peg [12] comprising a top [20], having a removable foot pad [21] supported on it, two spaced channel-like side flanges [22,24] attached to said top [20] and extending downwardly from said top [20], said flanges [22,24] extending toward said bracket [14] forming ears [26,28] and receiving said bracket [14] between said ears [26,28], hinge pin [30] extending through said ears [26,28] and through said bracket [14], forming a hinge, said hinge pin [30] having two enlarged ends [32,34] attached to said hinge pin [30], said enlarged ends [32,34] overlying the ends of said ears [26,28], an end flange [36] attached to said side flanges [22,24] and extending downwardly therefrom and attached to said side flanges [22,24], a web [38] between said hinge pin [30] and said flange [36], said web [38] being fixed to said [20] top and to said side flanges [22,24], an opening [40] in one said side flange [22] adjacent said end flange [36], a lamp socket [42] in said opening [40] supporting said lamp [16], said lamp socket [42] having a lamp base [44], fastening means [46] on said base [44] overlying outside of said side flange [24] around said opening [40], said lamp [16] being received in said lamp socket [42], an electrical line [48] attached to said lamp base [44], a central opening [50] in said web [38], rubber grommet means [52] in said central opening [50], said electrical line [48] extending through said rubber grommet [52] between said hinge pin [30] and said top [20] and adapted to be attached to an electrical system.

2. The combination recited in claim 1 wherein said lamp base [44] has an enlarged part overlying said side flanges [22,24].

3. The combination recited in claim 2 wherein said electrical line [48] extends through said rubber grommet [52] between said hinge pin [30] and said top [20] and adapted to be attached to an electrical system.

4. The combination recited in claim 1 wherein said top member has a non-skid top surface and upwardly and inwardly extending flanges [60] supported on it and said removable foot pad [21] has outwardly extending flanges [58] received under said outwardly extending flanges whereby said removable foot pad [21] can be removed and replaced when said non-skid surface becomes worn or damaged.

5. The combination recited in claim 5 wherein said non-skid surface comprises longitudinally extending ribs [56] defined by spaced grooves [54] in said non-skid surface.

6. The combination in claim 6 wherein said removable foot pad [21] is made of a rubber-like material

* * * * *